US008204956B2

(12) United States Patent
Berkowitz et al.

(10) Patent No.: US 8,204,956 B2
(45) Date of Patent: *Jun. 19, 2012

(54) COMPUTER-IMPLEMENTED VOICE APPLICATION INDEXING WEB SITE

(75) Inventors: Stuart Berkowitz, Toronto (CA); Robert Marchand, King City (CA)

(73) Assignee: Genesys Telecomunications Laboratories, Inc., Daly City, CA (US)

( * ) Notice: Subject to any disclaimer, the term of this patent is extended or adjusted under 35 U.S.C. 154(b) by 715 days.

This patent is subject to a terminal disclaimer.

(21) Appl. No.: 12/127,696

(22) Filed: May 27, 2008

(65) Prior Publication Data

US 2008/0228488 A1    Sep. 18, 2008

Related U.S. Application Data

(63) Continuation of application No. 09/759,926, filed on Jan. 12, 2001, now Pat. No. 7,379,973.

(51) Int. Cl.
*G06F 15/16*    (2006.01)
(52) U.S. Cl. ............... 709/217; 379/88.01; 715/234
(58) Field of Classification Search .......... 709/217, 709/201, 203, 226
See application file for complete search history.

(56) References Cited

U.S. PATENT DOCUMENTS

| 6,400,806 | B1* | 6/2002 | Uppaluru | 379/88.02 |
|---|---|---|---|---|
| 6,460,057 | B1* | 10/2002 | Butler et al. | 715/204 |
| 6,704,708 | B1* | 3/2004 | Pickering | 704/235 |
| 6,711,618 | B1* | 3/2004 | Danner et al. | 709/228 |
| 6,738,803 | B1* | 5/2004 | Dodrill et al. | 709/218 |
| 6,779,154 | B1* | 8/2004 | Nussbaum et al. | 715/234 |
| 6,831,915 | B1* | 12/2004 | Beyschlag et al. | 370/352 |
| 6,847,999 | B1* | 1/2005 | Dodrill et al. | 709/225 |
| 6,901,431 | B1* | 5/2005 | Dodrill et al. | 709/207 |
| 7,415,537 | B1* | 8/2008 | Maes | 709/246 |
| 2005/0193332 | A1* | 9/2005 | Dodrill et al. | 715/513 |

* cited by examiner

*Primary Examiner* — Dustin Nguyen
(74) *Attorney, Agent, or Firm* — Donald R. Boys; Central Coast Patent Agency, Inc.

(57) ABSTRACT

A computer-implemented voice application indexing method and system for supplying voice applications that provide telephony services to users. The method and system include receiving voice application data over the network regarding the voice applications. The voice application data contains location data to indicate where the voice applications are located on the network. The voice application data are stored in a database in accordance with a predetermined voice application taxonomy. A request is received for a voice application based upon a user requesting a telephony service. The request includes search criteria for selecting a voice application from the database. The location data of at least one voice application (whose stored voice application information substantially satisfies the search criteria) is retrieved from the database. The voice application located at the retrieved location data is used to perform the user-requested telephony service.

14 Claims, 9 Drawing Sheets

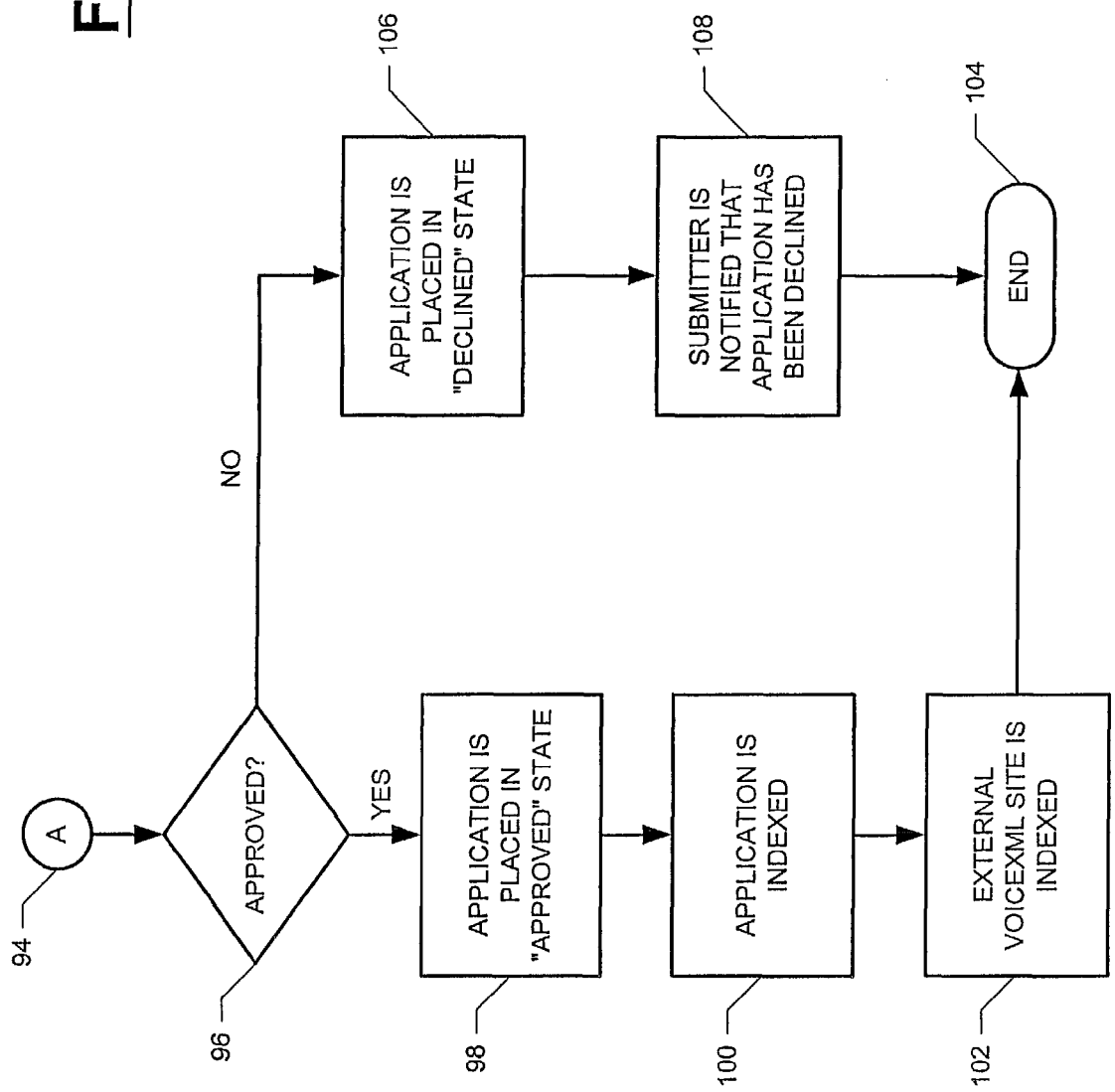

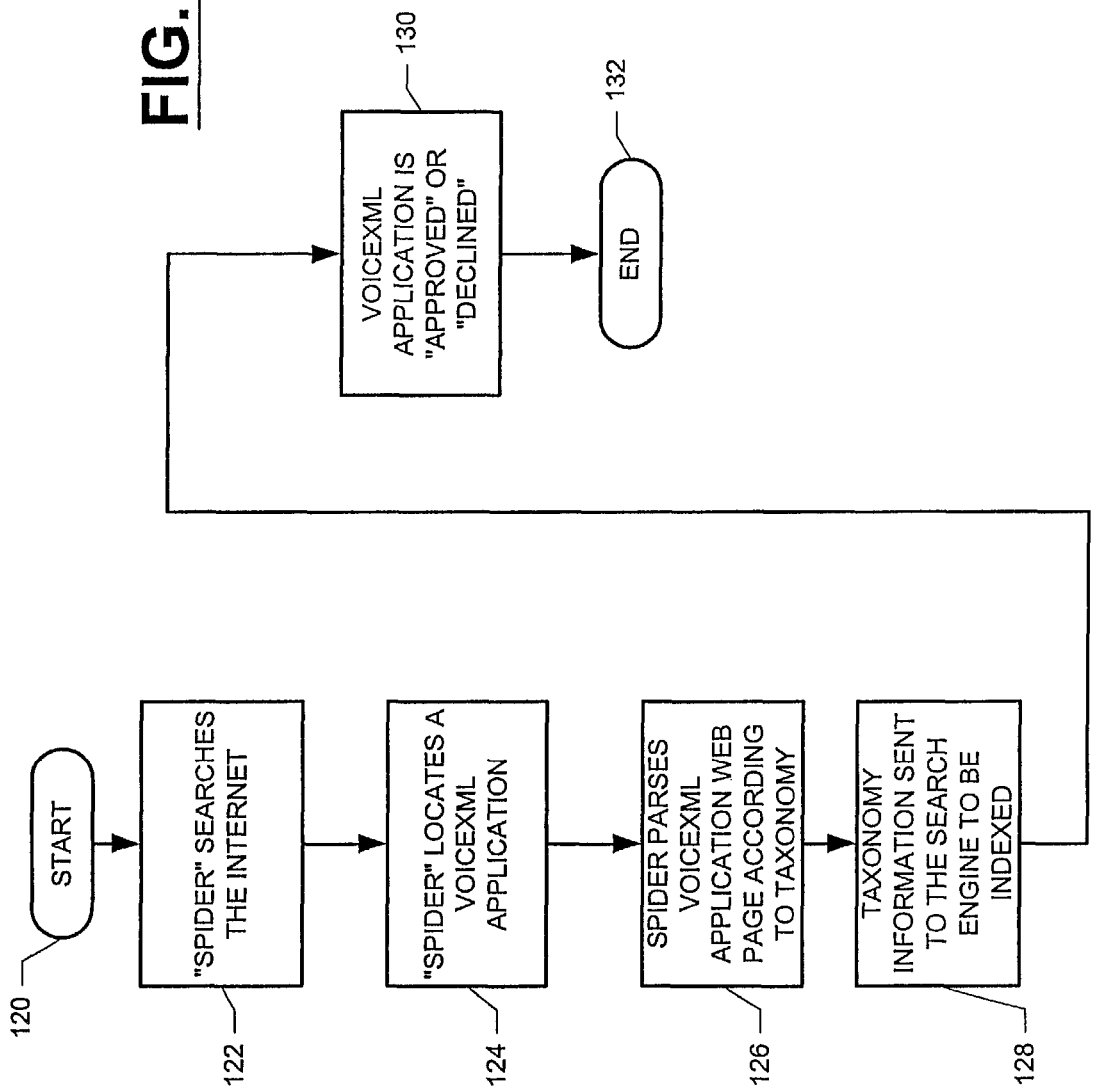

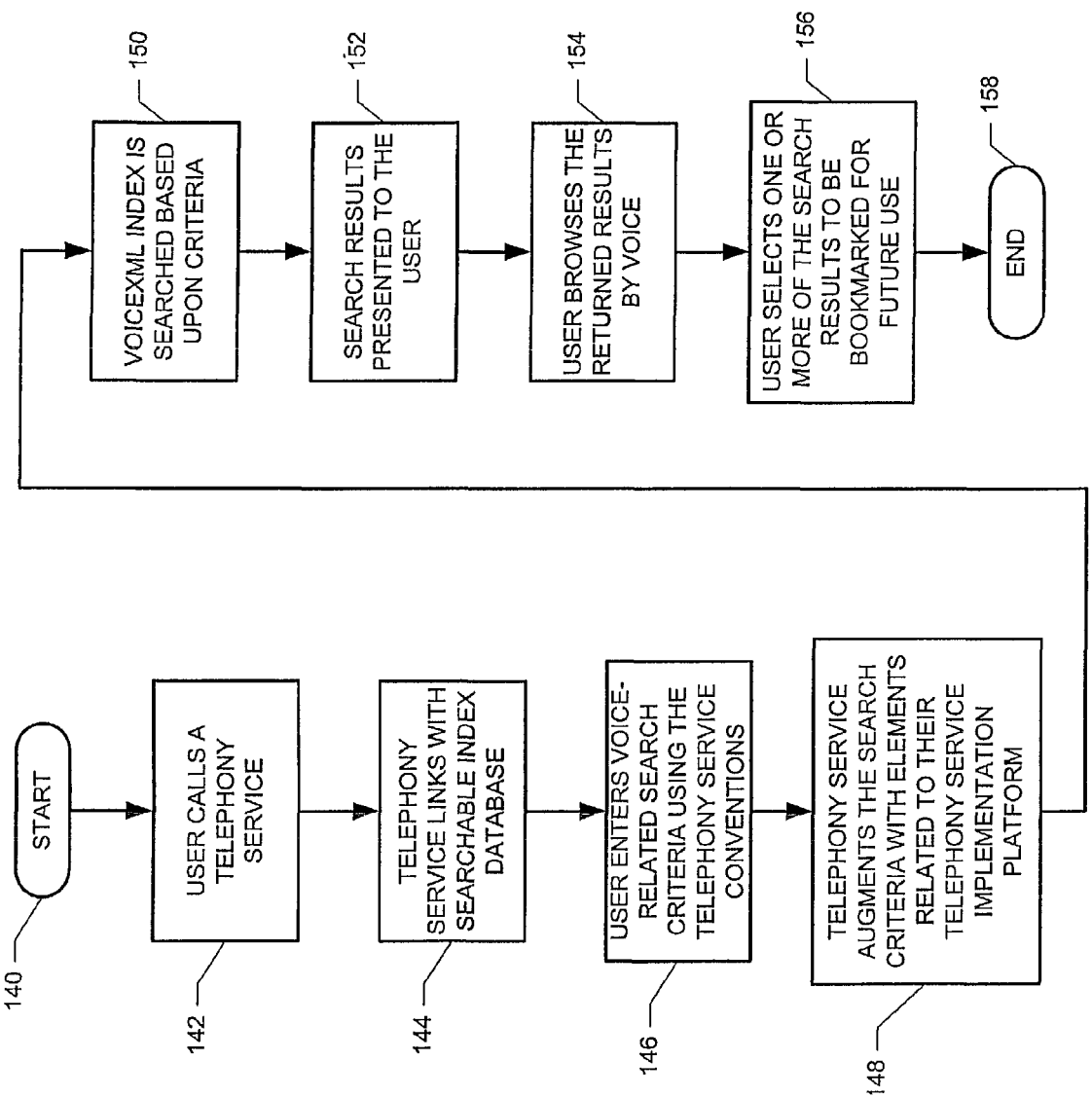

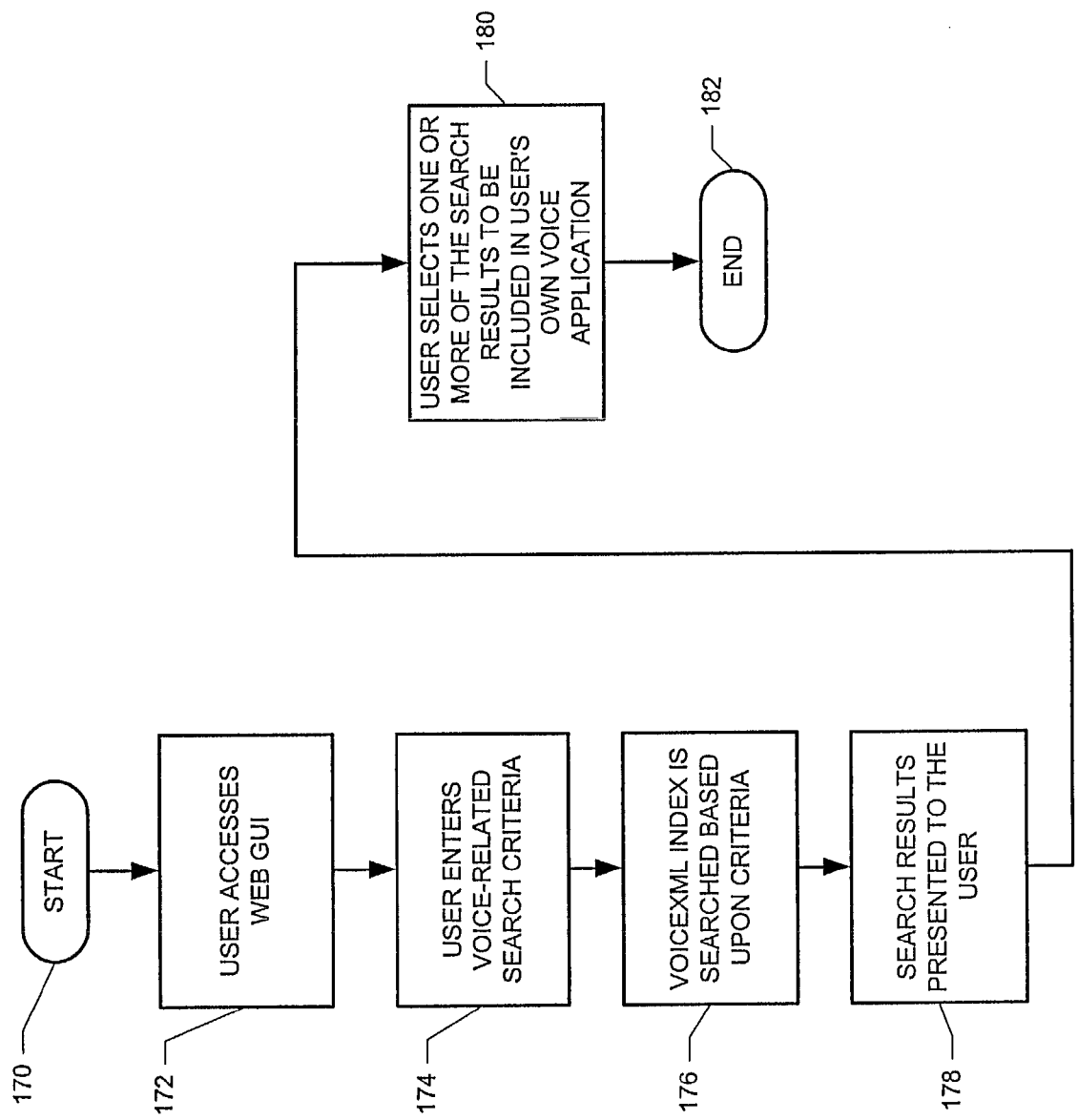

COMPUTER-IMPLEMENTED VOICE APPLICATION INDEXING WEB SITE

The present patent application is a Continuation of application 09/759,926, filed on Jan. 12, 2001, now U.S. Pat. No. 7,379,973, which is incorporated herein in its entirety by reference.

BACKGROUND

1. Technical Field

The present invention is directed to Internet search engines. More specifically, the present invention is directed to Internet voice-related search engines.

2. Description of the Related Art

Presently, the Internet provides users with visually-based interfaces to service applications. Internet users employ keyboards, pointing devices and other such techniques to interact with Internet applications. Internet applications include for example content searching applications as provided by such companies as Yahoo or Infoseek. Other applications include address or phone number lookups.

Telephone users have difficulty in using Internet applications due to their devices not being adept to interacting with the visually-based interfaces of the Internet applications. For example, cell phone users have relatively small displays within which to view Internet information. To mitigate this problem, voice markup languages have been introduced to make available the services of the Internet to telephone users. One such voice markup language is VoiceXML which permits users to interact with Internet web pages using an audio (i.e., telephone) interface.

An example of a VoiceXML application is a restaurant locating application with which a user can communicate in order to locate a restaurant in a certain city. Such interaction includes asking the user questions, such as the type of restaurant and location. Another VoiceXML application may interact with the user to provide directions to the restaurant. VoiceXML applications typically reside on Internet web sites. Telephony servers act as an interface with the web sites and allow the VoiceXML applications to interact with the user.

Telephony servers require a wide range of voice applications as they are driven by the ever varying service needs of their users. However, locating the specific voice application to fulfill a need of their users in real-time is difficult. For example, a voice application to locate restaurants in Chicago may require one type of speech recognition engine, while another voice application to locate restaurants in San Francisco may require another type.

Since the needs are dynamic and must be satisfied in real-time, telephony servers require a mechanism that can quickly locate the correct voice application. Most telephony servers lack such a mechanism and rely upon "hard-wired" solutions where the telephony servers use only a pre-selected number of voice applications whose operational requirements are known beforehand. Limiting the pool of voice applications to a certain pre-selected number is an undesirable trait of the current telephony approaches.

SUMMARY

The present invention solves the aforementioned disadvantages as well as other disadvantages of current telephony approaches. In accordance with the teachings of the present invention, a computer-implemented voice application indexing method and system provide voice applications that supply telephony services to users. The method and system include receiving voice application data over the network regarding the voice applications. The voice application data contains location data that indicate where the voice applications are located on the network. The voice application data are stored in a database in accordance with a predetermined voice application taxonomy. A request is received for a voice application based upon a user requesting a telephony service. The request includes search criteria for selecting a voice application from the database. The location data of at least one voice application (whose stored voice application information substantially satisfies the search criteria) is retrieved from the database. The voice application located at the retrieved location data is used to perform the user-requested telephony service.

BRIEF DESCRIPTION OF THE DRAWINGS

FIGS. 5 and 6 are flowcharts depicting the process steps to index a voice markup language application;

FIG. 7 is a flowchart depicting the process steps to automatically search for remote Internet voice markup language applications;

FIG. 8 is a flowchart depicting the process steps to perform a search within a wireless communication device context; and FIG. 9 is a flowchart depicting the process steps to perform a search within a web graphical user interface context.

DETAILED DESCRIPTION OF THE PREFERRED EMBODIMENT

Figure 1:
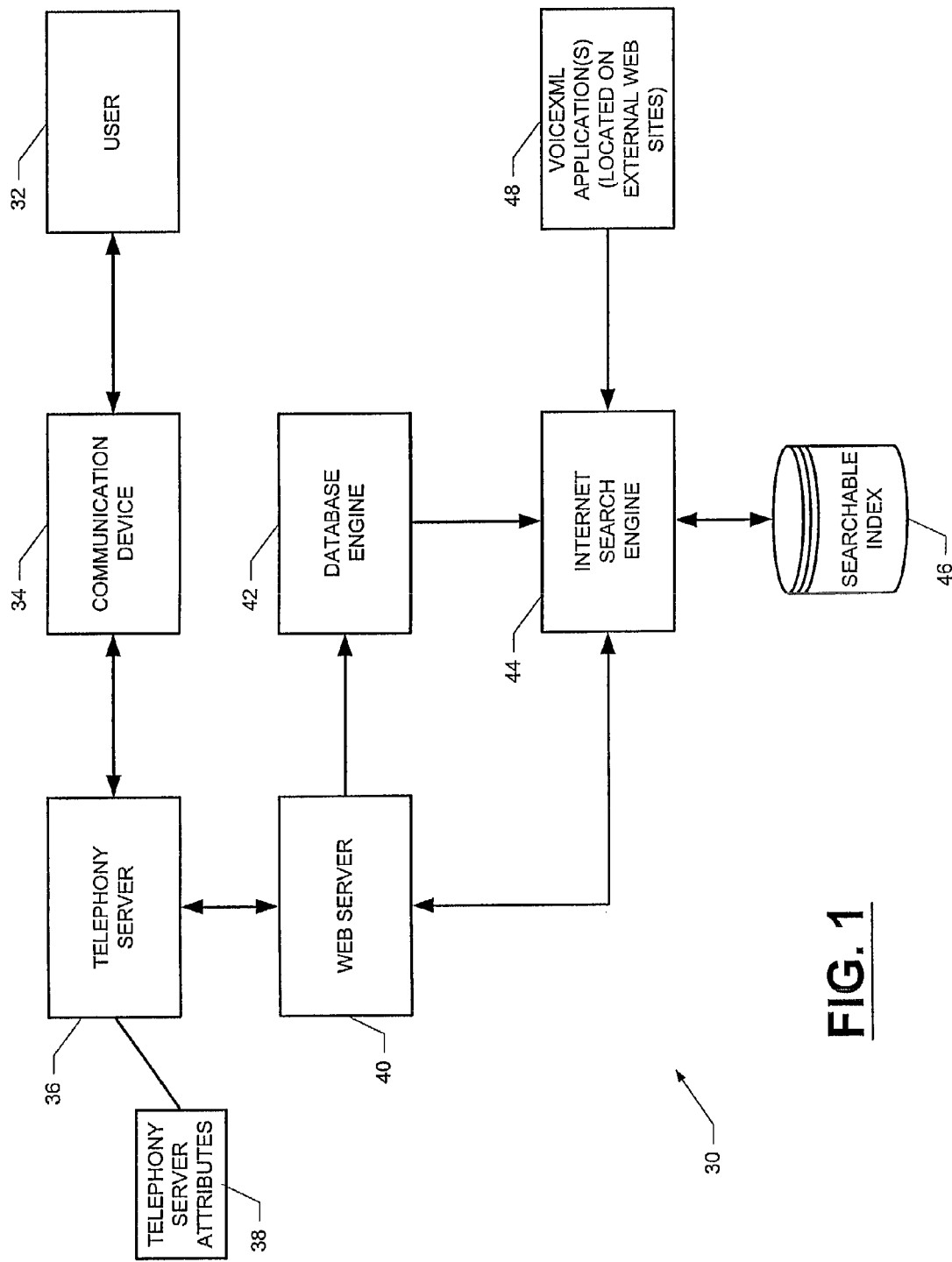
FIG. 1 is a system diagram depicting computer-related components of the present invention as used within a telephony server context.

FIG. 1 is a system block diagram that generally shows at 30 the computer-implemented components of the present invention. The present invention indexes and catalogues voice computer applications, such as VoiceXML applications. The voice applications are able to be searched using the index and linked into a user's telephony server. Once linked, the user has access via a wireless communication device to the services provided by the voice applications.

With reference to FIG. 1, a user 32 utilizes a communication device 34 to access the user's telephony server 36. The present invention may be utilized by many different types of communication devices, such as a cellular communication device. The present invention also may be used by any communication device that can access a telephony server, such as a regular telephone.

The user 32 may be utilizing the communication device 34 to have a service performed. An example of a service includes the telephony server 36 receiving a call from the user 32 so that the user 32 may locate a restaurant in a certain city. The telephony server 36 uses a web server 40 to access a restaurant-locating voice application 48 that is on a network, such as the Internet. The voice application 48 may be a VoiceXML application located on a remote web site. Another exemplary voice application includes the user 32 calling to locate the phone number of another individual.

The telephony server 36 determines that a service is needed in order to process the request from the user 32. The telephony server 36 communicates to the web server 40 the characteristics of the needed service. The web server 40 uses the present invention to locate a voice application 48 that can provide the needed service.

The web server 40 communicates to a database engine 42 the characteristics of the needed service. The database engine 42 uses an Internet search engine 44 to search a voice application index database 46. The database 46 contains an index of voice applications that have been catalogued according to a taxonomy of the present invention. For example, the taxonomy includes indexing voice applications based upon what resources are required to operate each voice application.

The database engine 42 formulates search criteria to locate voice applications that can provide the needed service. The search criteria is formulated based upon the characteristics of the needed service. The characteristics include what type of application is needed, such as whether the telephony server needs a restaurant-locating voice application or some other voice application type. The search criteria also includes telephony server attributes 38. Telephony server attributes 38 describe the operating characteristics of the telephony server 36, such as what speech engines are able to operate on the telephony server.

The Internet search engine 44 uses the search criteria to determine which voice applications are suitable to fulfill the telephony server's request. When the location of at least one suitable voice application has been identified, the Internet search engine 44 retrieves the suitable voice application 48 over the Internet. The Internet search engine 44 then provides the voice application 48 to the telephony server 36 via the web server 40. The telephony server 36 performs the functions of the voice application 48 in order to satisfy the request of the user 32.

Figure 2:
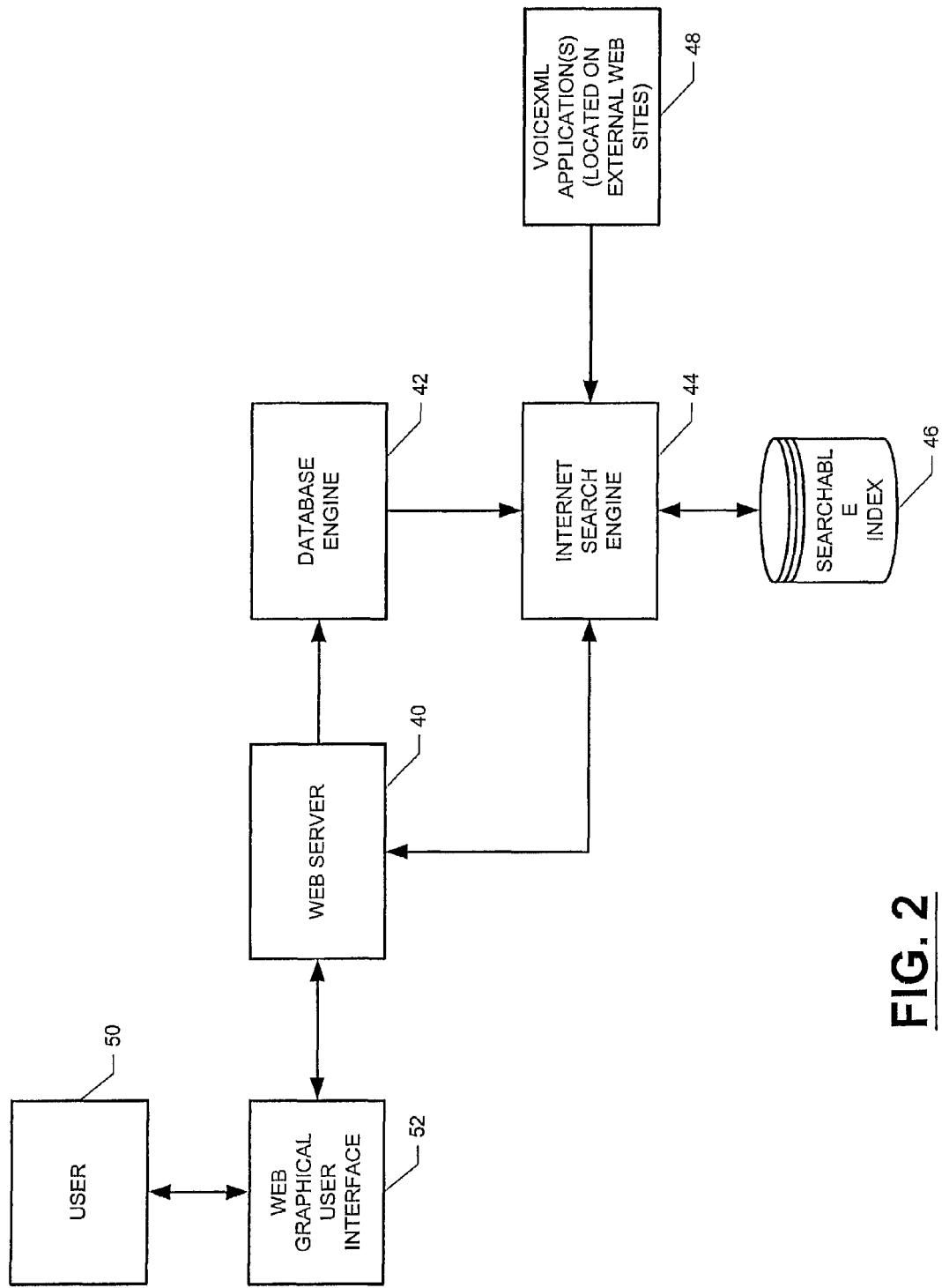
FIG. 2 is a system diagram depicting computer-related components of the present invention as used within a web graphical user interface context.

FIG. 2 depicts the use of a web graphical user interface 52 for a user 50 to enter voice application data into the data structure of the present invention. The interface 52 provides data entry regions for the user 50 to complete. The interface 52 follows the taxonomy of the present invention so that voice applications can be properly indexed. For example, the interface 52 obtains from the user 50 what resources a voice application requires. Exemplary resource requirements include what speech recognition engines and/or text-to-speech engines are required by the voice application.

Voice application licensing data may also be collected by the interface 52. For example, the telephony server may have to pay a set amount for each use of a remote voice application. A voice application's compliance with a voice markup language standard may be collected by the interface 52. The compliance data may specify which voice markup language and version of the language are being used by the voice application. Other information supplied by the user includes the location and description of the voice application. The interface 52 provides a list of categories from which the user 50 may select in order to classify the voice application. The interface 52 provides the collected information to the Internet search engine 44 which stores it in the index database 46 in accordance with the taxonomy of the present invention.

The interface 52 provides further features that allow users to browse voice application web sites and information, to search for voice application sites based upon a set of criteria, and to collect resultant Uniform Resource Locators (URLs) and to make later use of them in their own voice browsers. Voice browsers allow users to manage and navigate within one or more VoiceXML applications.

Figure 3:
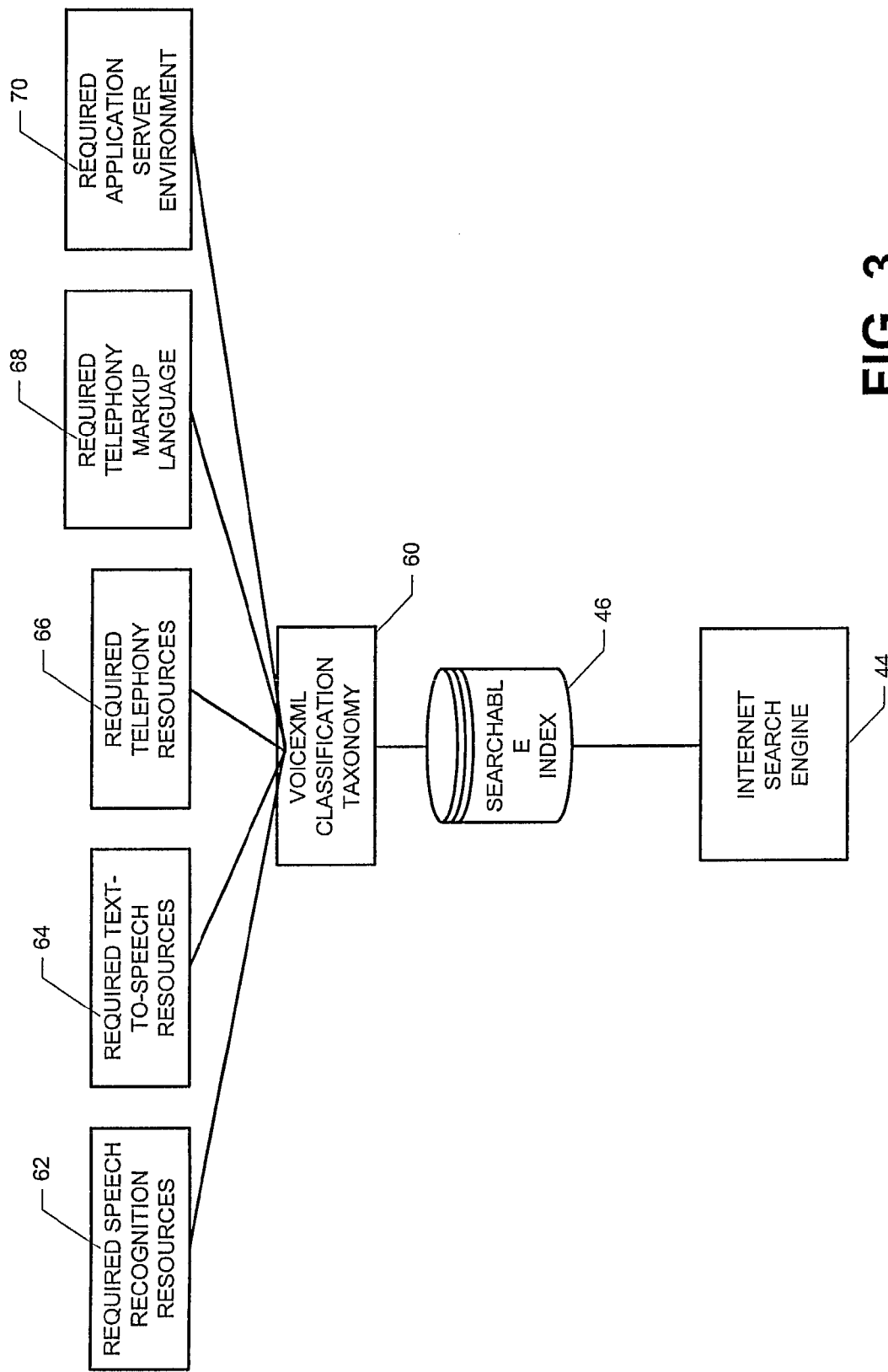
FIG. 3 is a data structure diagram depicting the schema of the searchable index database.

FIG. 3 is a data structure diagram depicting the schema of the searchable index database 46. The index database 46 is structured according to a taxonomy 60 that classifies voice applications. The taxonomy 60 includes: a data structure 62 to store information about speech recognition resources required by the voice applications; a data structure 64 to store information about text-to-speech resources required by the voice applications; a data store 66 to store telephony resources required by the voice applications; a data structure 68 to store the version of the markup languages used by the voice applications; and a data structure 70 to store the application server environment information and licensing information of the voice applications. The schema of the index database 46 may be implemented in a relational database. However, it should be understood that the present invention is not limited to a relational database environment, but includes computer information storage schemes that permit the storage and retrieval of the voice application classification data.

Figure 4:
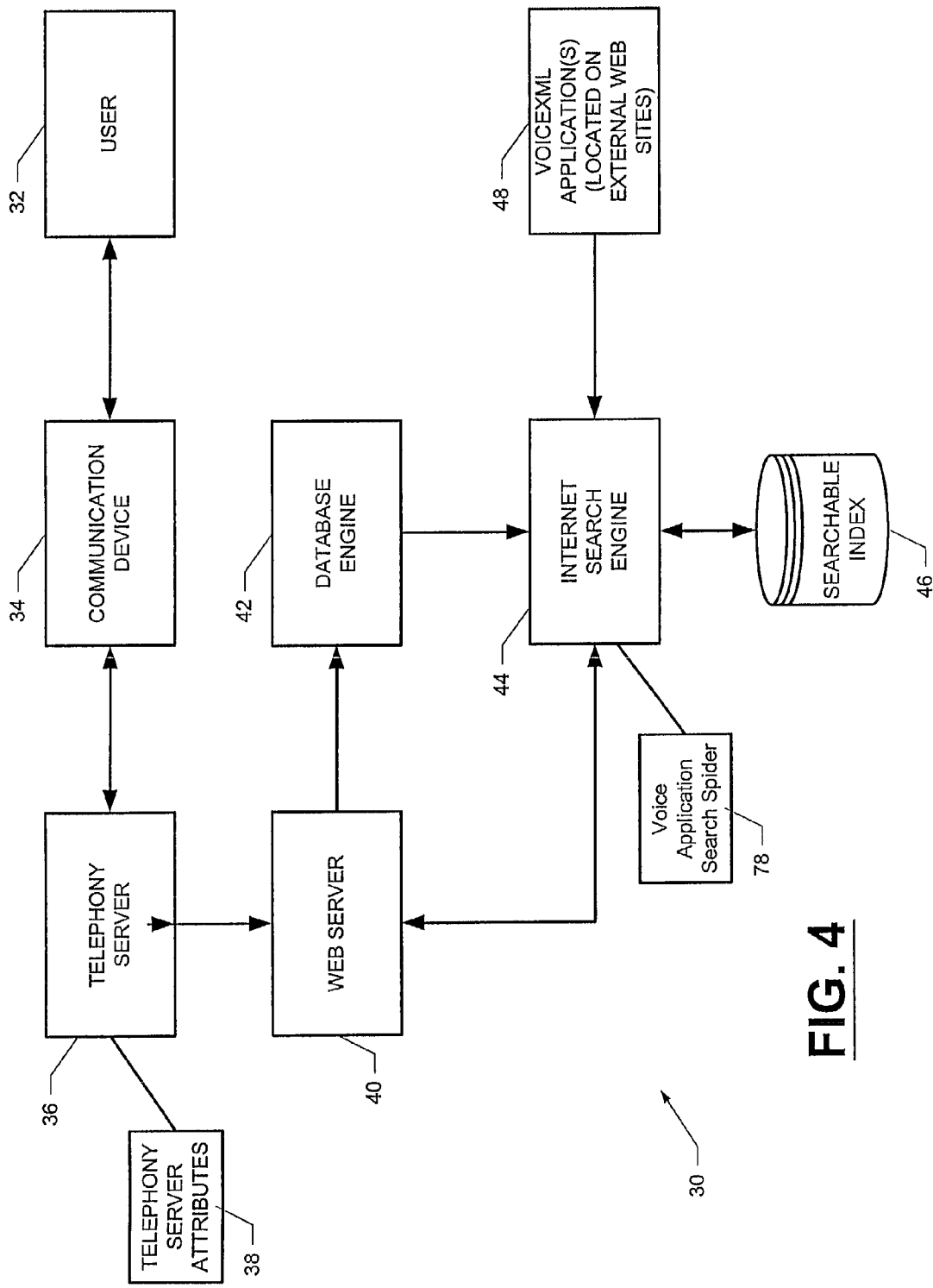
FIG. 4 is a system diagram depicting automated voice application indexing performed by the present invention.

FIG. 4 is a system diagram depicting automated voice application indexing as performed by the present invention. Automated indexing may be used exclusively or in parallel with a web interface to collect voice application data. Automated indexing may also be performed when a voice application cannot be located within the index database 46 that can perform the service requested by the telephony server 36. In such a situation, the Internet search engine 44 creates an automated Internet voice application search spider 78 to locate an appropriate voice application on the Internet. Moreover, if a voice application cannot be located within the index database 46, then the present invention posts on its web server 40 that such a voice application is needed. Voice application developers may then generate voice applications after seeing the posted notice or receiving an electronic mail message from the present invention that such a voice application is needed. The posted notice on the web server's voice application web page and the electronic mail message contain the technical requirements for the desired voice application, such as the attributes 38 of the telephony server 36 that requested the voice application.

Figure 5:
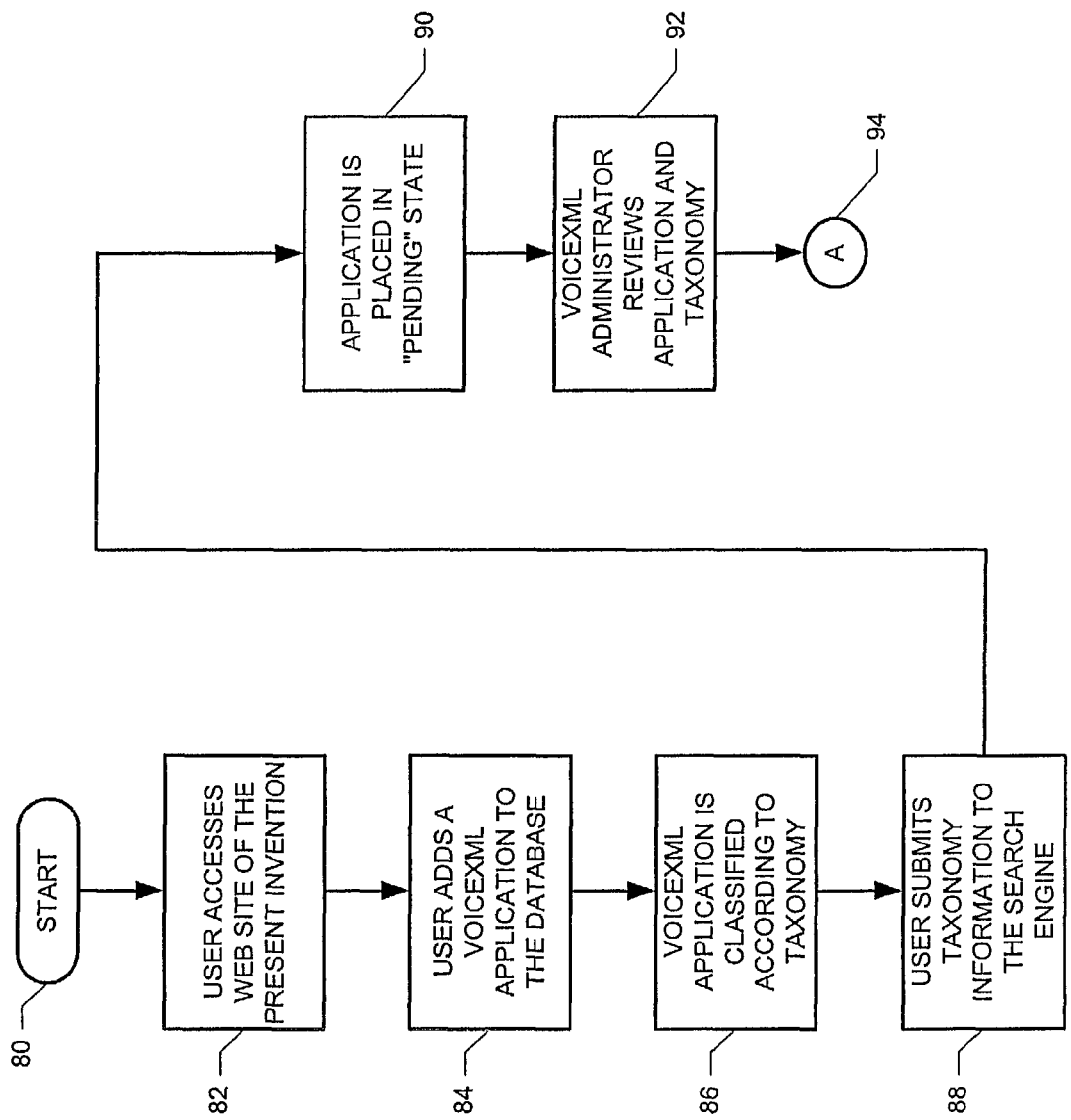

FIGS. 5 and 6 are flowcharts depicting the process steps to index a voice markup language application. With reference to FIG. 5, start indication block 80 indicates that process block 82 is performed wherein a user accesses the web site of the present invention. At process block 84, the user provides information about a voice application to the present invention.

Process block 86 classifies the voice application data in accordance with the taxonomy scheme of the present invention. Process block 88 submits the taxonomy information to the search engine which places the voice application in a "pending state" at process block 90. The voice application remains in a "pending" state until it is approved by a voice application web site administrator. At process block 92, the administrator reviews the voice application information to verify that the voice application exists at the specified location and operates in accordance with the classification information provided by the user. Continuation block 94 indicates that processing continues at decision block 96 on FIG. 6.

With reference to FIG. 6, decision block 96 determines whether the voice application should be approved based upon the review by the administrator. If the voice application is approved for use by telephony servers, then process block 98 updates the index database to indicate that the voice application is in an "approved" state. Process blocks 100 and 102 respectively allow the voice application and its external web site to be formally indexed within the database. Processing terminates at end block 104.

If the voice application is not approved at decision block 96, then process block 106 updates the index database to indicate that the voice application is in a "declined" state.

Process block 108 notifies the voice application submitter that the application has been declined. Processing terminates at end block 104.

FIG. 7 is a flowchart depicting the process steps to automatically search for remote Internet voice markup language applications. Start indication block 120 indicates that process block 122 is performed wherein the present invention creates and sends out on the Internet a spider to search for voice applications.

At process block 124, the spider locates a voice application and parses at process block 126 the voice application in accordance with the taxonomy of the present invention. Preferably, the spider parses the metatags of the voice application in order to extract such exemplary taxonomy information as description and voice markup language version data.

Process block 128 sends the taxonomy information to the search engine in order to be indexed. The voice application is approved or declined based upon review by the administrator at process block 130. If the voice application is approved, then the voice application is made available to telephony servers and the web community. Processing terminates at end block 132.

FIG. 8 is a flowchart depicting the process steps to perform a voice application search within a wireless communication device context. Start indication block 140 indicates that process block 142 is performed wherein a user calls a telephony server in order to request a service. At process block 144, the telephony service links to the searchable index database of the present invention in order to locate a voice application to perform the service. Criteria to search the database is provided by the user at process block 146. At process block 148, the telephony service augments the search criteria with information related to the telephony server implementation platform.

Process block 150 uses to the criteria to search the voice application index database. Process block 152 returns the voice application to the telephony service so that the voice application can perform the requested service. The present invention also allows the user to browse at process block 154 the voice application search results and to select which of the returned voice applications to use. Process block 156 allows the user to bookmark voice applications that the user wishes to use in the future.

FIG. 9 is a flowchart depicting the process steps to perform a search within a web graphical user interface context. Start indication block 170 indicates that process block 172 is performed wherein a user accesses the web graphical user interface (GUI) of the present invention. At process block 174, the user enters voice-related search criteria through the interface.

Process block 175 searches the voice application index of the present invention based upon the criteria specified by the user. The search results are presented to the user at process block 178. The user selects at process block 180 one or more of the search results to be included in the user's own telephony server application. Processing terminates at end block 182.

The preferred embodiment described with reference to the drawing figures is presented only to demonstrate an example of the invention. Additional and/or alternative embodiments of the invention will be apparent to one of ordinary skill in the art upon reading this disclosure.

The invention claimed is:

1. A method, implemented by software stored on and executing from a computerized server connected to the Internet, for providing a voice application to provide telephony service to a user, comprising the steps of:

(a) storing data regarding voice applications in a data repository, the data including a location on the Internet where each voice application is stored and from where it may be downloaded, the resources required to operate each voice application, and the type of telephony service provided by each voice application;

(b) receiving from the user a request for a voice application, the request including the resources required, and the type of telephony service required; and (c) using the information received from the user, consulting the stored data to retrieve from a location on the Internet a voice application meeting the user's requirements; and (d) providing the retrieved voice application to the user.

2. The method of claim 1 wherein the voice application data includes voice application operational requirement data, server attribute data is received from a telephony server that is an interface between the user and the data repository, and the location data provides access to at least one voice application whose operational requirement data satisfies the telephony server attribute data.

3. The method of claim 1 wherein the voice application data includes which type of voice markup language is used in the voice applications, and the location data provides access to at least one voice application whose voice markup language data satisfies the voice markup language criteria.

4. The method of claim 1 wherein the voice application data includes speech engine requirement data, server attribute data which indicates which speech engines are operational within the telephony server is received, and the location data provides access to at least one voice application whose speech engine requirement data satisfies the telephony server attribute data.

5. The method of claim 1 wherein the voice applications are VoiceXML applications.

6. The method of claim 1 wherein the location data is a Uniform Resource Locator (URL) of a remote Web site which indicates where the voice applications are located on the Internet network.

7. The method of claim 1 wherein the voice application data includes classifications selected from the group consisting of required speech engine resources, required telephony resources, required telephony markup language, required application server environment, and combinations thereof 8. An Internet-connected server providing a system having microprocessor and memory for serving a voice application to provide telephony service to a user, comprising:

software stored on and executing from the Internet-connected server, the software providing functions of:

storing data regarding voice applications in a data repository, the data including a location on the Internet where each voice application is stored and from where it may be downloaded, the resources required to operate each voice application, and the type of telephony service provided by each voice application;

receiving from the user a request for a voice application, the request including the resources required, and the type of telephony service required; and using the information received from the user, consulting the stored data to retrieve from a location on the Internet a voice application meeting the user's requirements; and providing the retrieved voice application to the user.

9. The system of claim 8 wherein the voice application data includes voice application operational requirement data, server attribute data is received from a telephony server that is an interface between the user and the data repository, and the location data provides access to at least one voice application whose operational requirement data satisfies the telephony server attribute data.

10. The system of claim 8 wherein the voice application data includes which type of voice markup language is used in the voice applications, and the location data provides access to at least one voice application whose voice markup language data satisfies the voice markup language criteria.

11. The system of claim 8 wherein the voice application data includes speech engine requirement data, server attribute data which indicates which speech engines are operational within the telephony server is received, and the location data provides access to at least one voice application whose speech engine requirement data satisfies the telephony server attribute data.

12. The system of claim 8 wherein the voice applications are VoiceXML applications.

13. The system of claim 9 wherein the location data is a Uniform Resource Locator (URL) of a remote Web site which indicates where the voice applications are located on the Internet network.

14. The system of claim 8 wherein the voice application data includes classifications selected from the group consisting of required speech engine resources, required telephony resources, required telephony markup language, required application server environment, and combinations thereof.

* * * * *